US006855252B2

(12) United States Patent
Brandreth, III

(10) Patent No.: US 6,855,252 B2
(45) Date of Patent: Feb. 15, 2005

(54) CHEMICAL DISPENSER CARTRIDGE FOR FILTER DEVICES

(76) Inventor: John B. Brandreth, III, P.O. Drawer 1068, Canton, FL (US) 30114

( * ) Notice: Subject to any disclaimer, the term of this patent is extended or adjusted under 35 U.S.C. 154(b) by 42 days.

(21) Appl. No.: 10/315,524

(22) Filed: Dec. 9, 2002

(65) Prior Publication Data

US 2004/0108262 A1 Jun. 10, 2004

(51) Int. Cl.[7] ............................................. B01D 11/02
(52) U.S. Cl. ..................... 210/206; 210/261; 210/443; 210/446; 422/277; 137/268
(58) Field of Search ................................ 210/169, 206, 210/256, 232, 261, 440, 443, 446, 493.5; 422/261, 277; 137/268; 222/189.06

(56) References Cited

U.S. PATENT DOCUMENTS

| | | | |
|---|---|---|---|
| 2,135,932 A | 11/1938 | Belmont | |
| 2,891,622 A | 6/1959 | Patterson et al. | |
| 2,955,923 A | 10/1960 | Atkinson | |
| 3,195,558 A | 7/1965 | Klueber et al. | |
| 3,306,709 A | 2/1967 | Atkinson | |
| 3,442,800 A | 5/1969 | Jasionowski | |
| 3,481,857 A | 12/1969 | Gray | |
| 3,579,440 A | 5/1971 | Bradley, Jr. | |
| 3,612,080 A | 10/1971 | Schneider, Jr. et al. | |
| 4,059,522 A | 11/1977 | Polley et al. | |
| 4,347,224 A * | 8/1982 | Beckert et al. ............. | 422/277 |
| 4,691,732 A | 9/1987 | Johnson et al. | |
| 4,780,197 A | 10/1988 | Schuman | |
| 5,053,206 A | 10/1991 | Maglio et al. | |
| 5,106,501 A * | 4/1992 | Yang et al. ................. | 210/266 |
| 5,181,533 A | 1/1993 | Kooi | |
| 5,507,945 A | 4/1996 | Hansen | |
| 5,573,666 A | 11/1996 | Korin | |
| 5,580,448 A | 12/1996 | Brandreth, III | |
| 5,827,434 A | 10/1998 | Yando | |
| 5,843,309 A | 12/1998 | Mancil | |
| 5,855,777 A | 1/1999 | Bachand et al. | |
| 5,897,770 A | 4/1999 | Hatch et al. | |
| 5,927,610 A | 7/1999 | Dutcher | |
| 5,976,385 A | 11/1999 | King | |
| 5,993,753 A | 11/1999 | Davidson | |
| 6,004,458 A | 12/1999 | Davidson | |
| 6,267,886 B1 | 7/2001 | Brandreth, III | |
| 6,280,617 B1 | 8/2001 | Brandreth, III | |
| 6,325,926 B1 * | 12/2001 | Hansen ........................ | 210/209 |

* cited by examiner

Primary Examiner—Frank M. Lawrence
(74) Attorney, Agent, or Firm—Thomas C. Saitta

(57) ABSTRACT

A device for delivering chemical solutions into a liquid flow, where the chemical solution is created by dissolving solid chemical contained within a chemical dispenser cartridge, the dispenser cartridge having an intake aperture located on the upper portion of its side wall and a dispensing aperture on its removable cap member, such that a saturated chemical solution is formed in the cartridge and passes into the liquid flow through the dispensing aperture due to the pressure differential of the liquid flowing through a tubular filter, the dispenser cartridge being mounted within the tubular filter.

20 Claims, 3 Drawing Sheets

CHEMICAL DISPENSER CARTRIDGE FOR FILTER DEVICES

BACKGROUND OF THE INVENTION

This invention relates generally to the field of dispenser devices used to introduce small quantities of a chemical solution created by dissolving a solid or granular chemical into a flowing liquid. More particularly, the invention relates to such devices to be used as a component in water circulation or supply filtration systems, where the rate of introduction of the dissolved chemical into the water is controlled in a manner related to the flow volume of the water stream passing through a tubular filter block to insure proper concentration percentage. Even more particularly, the invention relates to such devices where the dispensing rate and the dispenser size is easily adjusted to a particular system to treat the water to the same volume capacity as the tubular filter block.

It is desirable or necessary in many water supply or recirculation systems, such as with water filtering units for household, commercial food service equipment or industrial use, or water for use in spas and pools, to add certain chemicals to the water to control bacteria or fungal growth, corrosion, scale deposits, etc. Commonly known additives include chlorine, polyphosphate or sodium silicate. Such additives are typically supplied in solid or granular form for ease of handling, and must therefore be dissolved in liquid to create a solution then introduced into the water flow. It is imperative that the chemical additives be supplied in the proper concentration, and it is important that the mechanism for adding the chemical solutions provide for proper rate introduction with little variation in concentration. Many conventional systems fail these criteria, the mechanisms being unable to prevent variations in concentration and introduction rates, especially in circumstances where the water flow is not continuous and varies in pressure.

The most simplistic solid chemical additive mechanisms simply divert all or a portion of the water flow stream through a container holding the solid chemical. The water flowing from the container will then include an amount of dissolved chemical. These devices suffer from lack of dispensing control, since the amount of chemical present in the outflow is dependent on the volume of solid chemical in the container. As that volume decreases, the concentration of dissolved chemical in the outflow also decreases. Additionally, this type of system produces a highly concentrated chemical surge when water flow is resumed after being shut off for a period of time. Finally, variation in the water flow rate will not correspondingly alter the dissolving rate of the chemical, producing incorrect concentration amounts in the outflow.

Attempts have been made to develop a mechanism which addresses the problems encountered in correctly metering and controlling the chemical introduction and concentration rates, but known systems are either overly complicated or do not fully solve all the problems set forth above. A complicated mechanism is described in U.S. Pat. No. 4,780,197 to Schuman, which discloses a flow-through chemical dispenser cartridge positioned within the internal core of a filter which requires one or more operational valves to perform effectively. A more simplified approach is shown in U.S. Pat. No. 4,347,224 to Beckert et al. This patent discloses a flow housing which contains an internally mounted chemical cartridge. A small amount of the water flow is diverted into the bottom of the chemical cartridge and the chemical solution is drawn through a small aperture in the top of the cartridge by the pressure differential created by the flow of the bulk of the water passing through the housing. This apparatus provides a simple approach to solving the problems encountered in standard solid chemical systems, but the mechanism is just a variation of the standard system where a portion of the water stream is passed through the solid chemical before being returned to the main flow stream. The distinction in Beckert et al. is that the cartridge containing the solid chemical is mounted within a large housing through which all the water flows. The sizing of the cartridge is such to create an annular passage down to the bottom of the chemical cartridge, where the water flows through a plurality of liquid inlet holes, past the chemical and out the liquid outlet hole. In effect, the annular passage is just a substitute for a small bypass conduit as found in many old systems, and the problems associated with variations in concentration and surging would still be present.

A much improved design and construction for a flow-through chemical dispenser cartridge is shown in my U.S. Pat. No. 5,580,448, the disclosure of which is incorporated herein by reference, wherein a unique cartridge configuration is used to correctly meter and control the chemical introduction and concentration rates of the dissolved solid chemical into the liquid flow stream. The dispenser unit has an upper base member with inlet and outlet openings, and a depending housing is threaded onto the base. A dispenser means comprising an upper tube, an apertured midsection and a cartridge containing the solid chemical is coaxially mounted within the housing, such that water flows through an annular filter, into flow openings in the apertured midsection above the cartridge and out from the top of the upper tube. While the dispenser unit functions at optimum efficiency, the design of the dispenser means is limiting in that particular flow paths are dictated by the housing structure, the flow rate of the dissolved chemical cannot be readily adjusted, and the overall dimensions of the dispenser means are fixed, such that a particular dispenser cannot be adapted for use in smaller housings.

Alternative constructions for dispenser cartridge units similar in function are also disclosed in my U.S. Pat. Nos. 6,267,886 and 6,280,617, the disclosures of which are incorporated herein by reference. In the earlier patent, a dispenser cartridge similar in construction to that of U.S. Pat. No. 5,580,448 is utilized in a unidirectional flow housing, such that the water flow path is from one end of the housing to the other, with the dispenser cartridge disposed generally coaxially with the flow path.

It is an object of this invention to provide a dispenser device for use within a filter system, wherein the dispenser device provides a steady state concentration of dissolved chemical, introduces the chemical solution into the main water stream in amounts directed related to water flow rate or volume to maintain precise percentages of chemical solution, does not produce excessive chemical concentration during periods of no water flow, and does not introduce excessive amounts of dissolved chemical when water flow is resumed. It is an object to provide such a device where the cartridge containing the solid chemical is not a flow through cartridge, such that water is not passed through the solid chemical. It is an object to provide such a device which improves on the functionality of previous similar devices, wherein the dispenser device is constructed such that the flow rate of the dissolved chemical may be easily altered as required for a particular application, wherein the dispenser device may be easily altered to adjust the chemical concentration in the water stream passing through the filter, and where the physical dimensions of the dispenser device may be easily altered to accommodate filter structures of different dimensions. These objects as well as other objects not expressly set forth in this paragraph will be made obvious from the following disclosure.

SUMMARY OF THE INVENTION

The invention comprises a dispensing cartridge device which is incorporated within a flow-through filter apparatus having a tubular type filter member, such that the flow-through filter housing is unidirectional or comprises a fixed base member with a removable cylindrical housing. In the fixed base filter, a fixed base member comprises an inlet opening connected to a water supply conduit, an outlet opening connected to a water outflow conduit, and an annular mounting flange adapted to receive a generally cylindrical, hollow, open top housing. A down flow opening in the fixed base diverts water from the inlet opening into the cylindrical housing, and a centrally located up flow opening in the fixed base receives water from the housing and directs it though the outflow opening. The cylindrical housing is adapted to receive a coaxially positioned, tubular, hollow core filter means, such as a pleated or carbon block filter, such that water must pass through the filter means when flowing from the inlet opening to the outflow opening. An axially positioned, generally cylindrical, dispenser cartridge means is disposed within the filter means.

In the unidirectional filter, a flow-through housing member has an inlet opening connected to a water supply conduit and an opposing outlet opening connected to a water outflow conduit, such that water flow is generally in a single direction. The housing, generally cylindrical in configuration, is adapted to receive a co-axially positioned, generally tubular, hollow core, filter means, such as a pleated or carbon block filter. The filter means is closed at the in-flow end and open at the outflow end, such that water is delivered to the outside of the filter means, passes through the filter means itself and then out through the open end of the filter means. An axially positioned, generally cylindrical, dispenser cartridge means is disposed within the filter means at the inflow end.

The dispenser cartridge means comprises a generally cylindrical, hollow, main body having a closed end, a side wall and an open end, and a removable cap member adapted to seal the open end of the main body. The dispenser cartridge means has one or more relatively small openings disposed in the side wall adjacent either the closed end or the cap member to define one or more intake apertures, and a relatively small opening is disposed in either the closed end or the cap member to define a dispensing aperture. The dispenser cartridge is adapted to receive a solid or granular chemical additive. Water passes into the interior of the dispenser cartridge through the intake apertures and a portion of the chemical additive dissolves to form a saturated chemical solution in the interior. The dispenser cartridge is mounted into a cartridge retainer means that also serves to close off one end of the tubular filter means. The cartridge retainer means maintains the dispenser cartridge in the proper position relative to the tubular filter means.

With water flow initiated through the filter apparatus, the pressure differential caused by the large volume flow of water through the tubular filter means above the dispenser cartridge causes a small portion of the chemical solution to be drawn through the dispenser aperture of the cartridge dispenser and into the main water flow stream, while simultaneously drawing a small amount of water into the upper interior of the dispenser cartridge to replace the suctioned chemical solution. Because the chemical dispenser cartridge has only small openings in relation to the volume of the chemical cartridge, the solution contained within the cartridge becomes chemically saturated. This solution remains saturated even when water flow is occurring, since the amount of water drawn into the intake apertures to replace the amount of solution drawn from the dispenser aperture is proportionally small relative to the total volume of the saturated solution contained within the dispenser cartridge. Because the solution within the cartridge is saturated, there will be no change in concentration during the period when no water flow is occurring.

The dispenser cartridge is provided with a removable cap member such that the overall length of the dispenser cartridge can be easily changed by removing the cap member, cutting off a portion of the open end, and replacing the cap member. The dispenser aperture is drilled into the cap member and the intake aperture or apertures are then drilled into the side wall of the dispenser cartridge as required. Shortening the cartridge relative to the filter means dilutes the concentration of the chemical within the water, since the shorter dispenser cartridge results in more water flowing through the filter means.

DETAILED DESCRIPTION OF THE INVENTION

The invention will now be described in detail, in conjunction with the drawings, with regard for the best mode and preferred embodiment. The invention is a chemical dispenser cartridge for introducing a chemical solution of predetermined concentration and amount into a flow of liquid, the dispenser being incorporated within an adjoined housing connected to inflow and outflow conduits of a water or other liquid delivery system, such as found in a residential or industrial setting for one-time water use or recirculation, such as for a spa or pool. The chemical is presented in a solid or granular form within the chemical dispenser and dissolves to create a solution to be introduced into the water flow stream, the chemical being of any soluble type which imparts beneficial properties to the water, such as prevention of bacterial, fungal, mold or other biological growth, reduction or control of deposits of scaling, corrosion control, etc.

Figure 1:
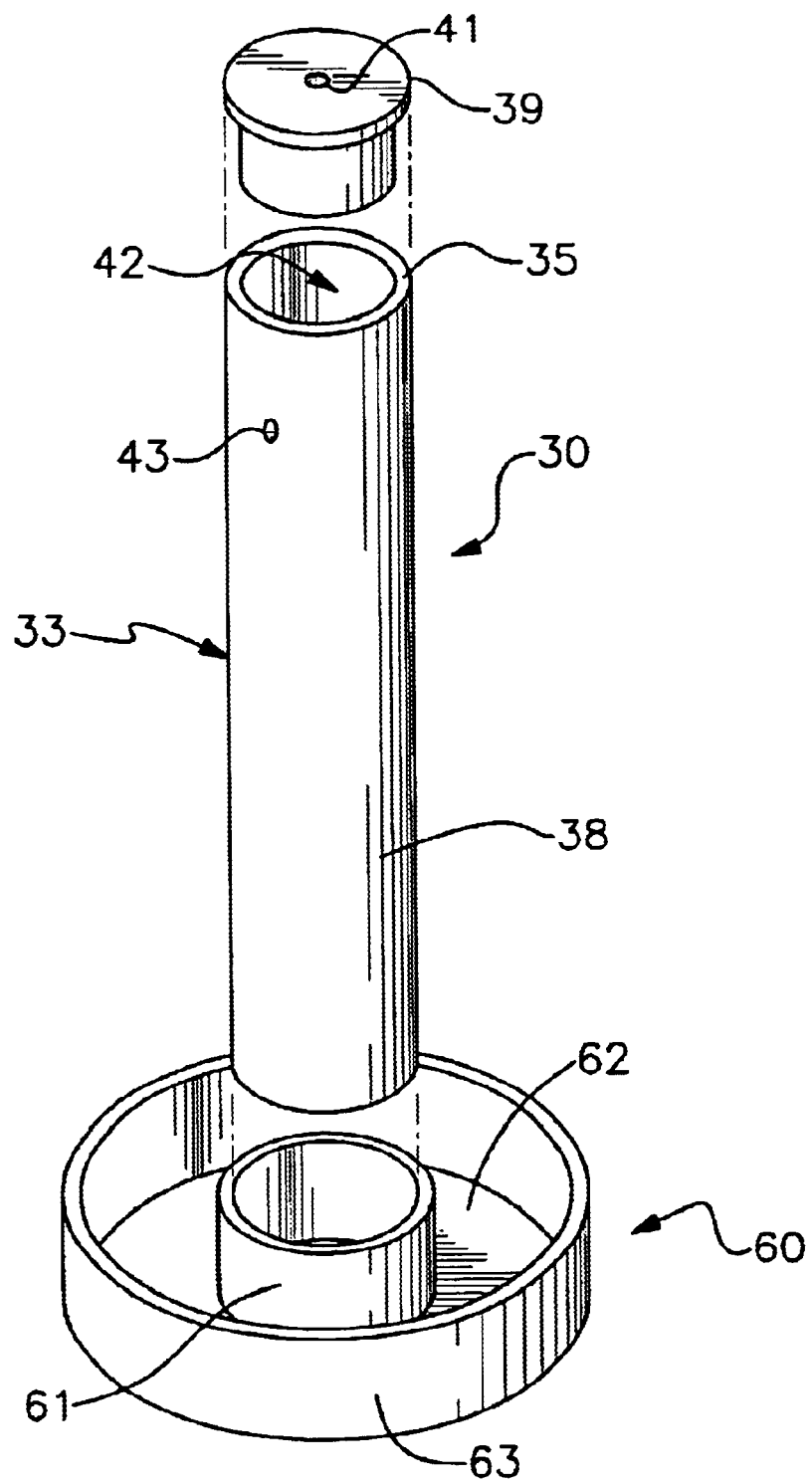
FIG. 1 is an exploded view of the dispenser cartridge.

With reference to FIG. 1, chemical dispensing cartridge means 30 is illustrated in exploded configuration, and comprises two main components—the dispenser cartridge 33 and the cartridge retainer means 60. The dispenser cartridge member 33 is generally cylindrical in overall configuration and comprises a closed bottom member 37, a side wall 38 containing at least one fluid intake aperture 43, an open top end 35 and a removable cap member 39 sized to fit into the open top end 35 and containing at least one dispensing aperture 41, preferably centrally located. In the preferred embodiment, there is a single intake aperture 43 and a single dispensing aperture 41. Intake aperture 43 is positioned in the upper half of side wall 38, preferably adjacent the top member 39. The combination of bottom member 37, side wall 38 and cap member 39 define a hollow interior 42 to receive the solid or granular chemical substance 40 to be dissolved. Intake aperture 43 is the only means for water to enter the interior 42 of chemical cartridge 33 and dispensing aperture 41 is the only means for the chemical solution 44 to exit the interior 42 of chemical cartridge 33. Dispensing aperture 41 and intake aperture 43 are sized relatively small in comparison to the interior volume of cartridge 33 and in comparison to the total area of flow through the tubular filter means 53. For example, in a dispensing cartridge 33 having an internal diameter of approximately 1 and ⅛ inches and a height of approximately 4 and ¾ inches, the dispensing aperture 41 in cap member 39 and the intake aperture 43 in the side wall 38 should be between approximately 0.042 and 0.1875 inches in diameter, and preferably about 0.0625 inches in diameter. Where multiple dispensing apertures 41 or intake apertures 43 are present, the combined total size of the openings should be in the same range. The size of the intake aperture 43 should be generally equal to the size of the dispensing aperture 41. The size of the intake aperture 43 and dispensing aperture 41 determine the feed rate, and can be varied in relation to the solubility characteristics or desirable concentrations of particular solid chemicals 40 needed for a given application.

The dispenser cartridge 33 is disposed in cartridge retainer means 60, which comprises a base member 62 having an interior retainer flange 61 sized to receive the bottom 37 of dispenser cartridge 33 in a relatively snug manner, and an outer flange 63 sized to receive an end of the tubular filter means 53. With the dispenser cartridge 33 secured in the cartridge retainer means 60, cartridge retainer means 60 is disposed onto the tubular filter means 53, thereby properly positioning the dispenser cartridge 33 and closing off the interior of the tubular filter means 53 such that water flow must pass through the tubular filter means 53.

Figure 2:
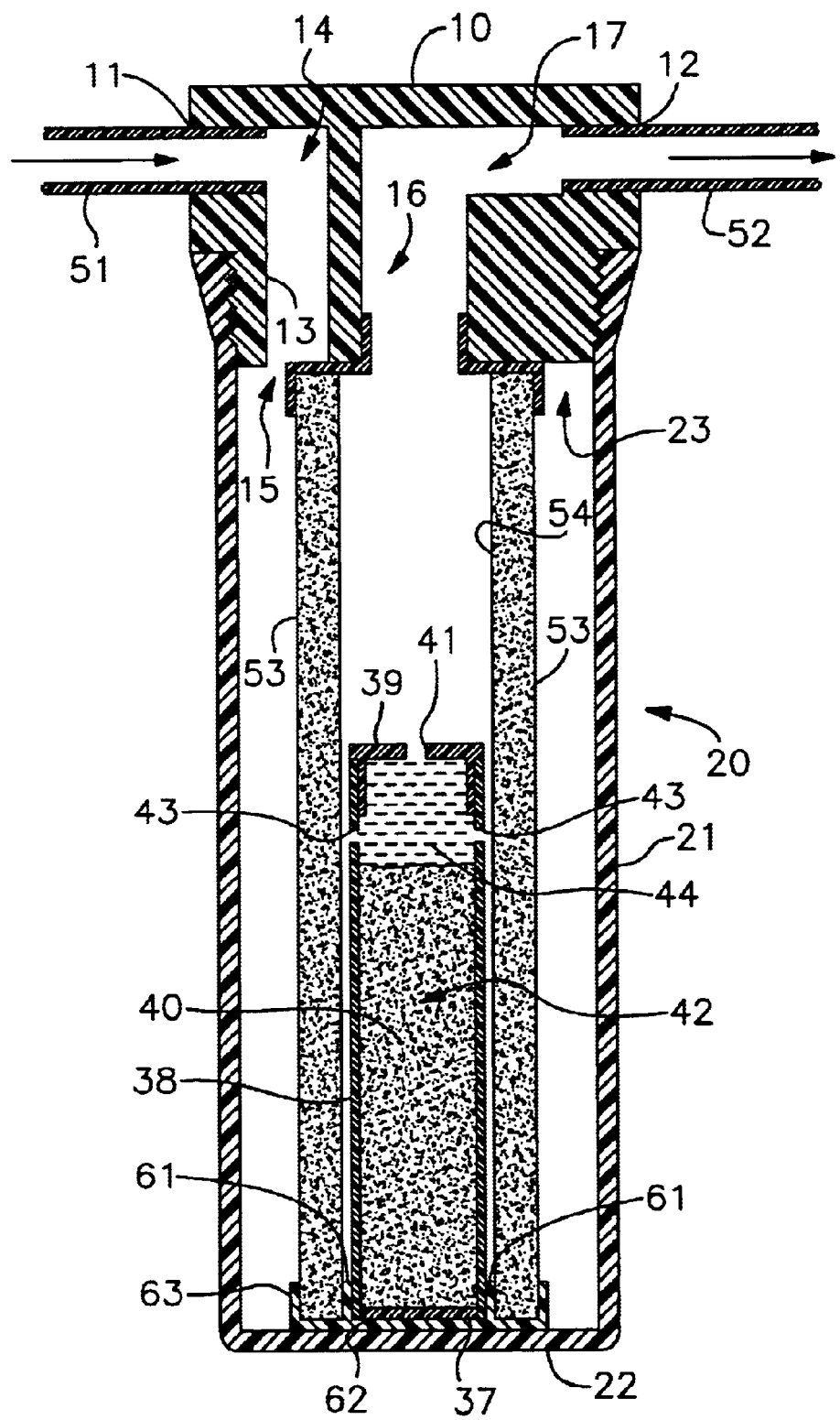
FIG. 2 is a cross-sectional view of the dispenser cartridge disposed within a fixed base filter apparatus.

With reference now to FIG. 2, the invention is disposed within a filtering apparatus comprising in general a fixed base member 10, a generally cylindrical housing 20 having an open top and adapted to be joined to base member 10. The fixed base member 10 is adapted to be connected in a water flow line, such that base member 10 is provided with an inlet opening 11, typically threaded, to receive the end of an inlet conduit 51 to deliver water or another liquid into the base member 10. Base member 10 is also provided with an outlet opening 12, also typically threaded, to receive the end of an outlet conduit 52, for delivery of the treated water or other liquid for usage. The base member 10 is provided with a depending mating means 13, such as a threaded annular flange, to matingly receive the cylindrical housing 20. The inlet opening 11 connects to an inflow conduit 14 which diverts the water flow downward through a downflow opening 15 beneath the base member 10, the downflow opening 15 being positioned to deliver the water into the interior of the cylindrical housing 20 adjacent the outer wall 21. The housing 20 is a hollow container having an outer wall 21, closed bottom 22 and open top 23, the upper portion of the housing 20 being threaded to mate in a detachable manner with the depending flange mating means 13, the combination of base member 10 and housing 20 forming a closed system whereby the water passes from the downflow opening 15 and can only exit from the housing 20 through a centrally located upflow opening 16, which is connected to the outlet opening 12 of base member 10 by outflow conduit 17.

The filter means 53 is a tubular member and typically comprises a carbon block filter, a wound filter, a melt blown filter, an extruded filter or a pleated membrane filter of known construction which abuts the bottom 22 of housing 20 and the bottom of base member 10, such that all water must pass through the filter means 53 before exiting the device. The chemical dispensing means 30 is positioned coaxially within the core 54 of the tubular filter means 53, such that it is surrounded by filter means 53.

Once the invention is installed in the water flow line and water flow is initiated for the first time, the water flows through downflow opening 15 into the interior of housing 20. The housing 20 and base 10 forming a closed system, the water passes through filter means 53 and contacts the dispenser cartridge 33. As water flows into the interior of the tubular filter means 53, a small amount of water enters the intake aperture 43 in the upper portion of side wall 38 of chemical dispenser cartridge 33 and fills the upper portion of the interior 42 of the cartridge 33, dissolving a portion of the solid or granular chemical 40 contained therein. After a short period of time, the percentage of solid chemical 40 dissolved in the water reaches its maximum saturated value, whereby no further dissolving can occur. At this point, the concentration percentage of the solution 44 becomes steady state. As water continues to flow into housing 20, the water flows up through upper conduit 31 into upflow opening 16, then through outflow conduit 17 through outlet opening 12 and into outflow conduit 52. The relatively large volume of water flow adjacent the dispensing aperture 41 results in a pressure differential which draws a small amount of the saturated chemical solution 44 from within the dispenser cartridge 33. This chemical solution 44 is then mixed in the turbulent flow such that water flowing from the device is treated as desired.

The amount of saturated chemical solution 44 drawn through the dispensing aperture 41 is a function of aperture size, which is predetermined, and water flow rate. This insures that the proper amount of saturated chemical solution 44 is introduced into the water flow no matter what flow rate is present. In addition, since the amount of saturated solution 44 drawn from the chemical dispenser cartridge 33 is relatively small in comparison to the total volume of saturated solution 44, and since the water drawn into the interior 42 through intake aperture 43 is likewise of small amount relative to the total volume of the saturated chemical solution 44, the solution 44 within the dispenser cartridge 33 remains in a constant, fully saturated condition. The chemical solution 44 remains at the same concentration within the dispenser cartridge 33 no matter what amount of solid chemical 40 is present in the cartridge 33, since the chemical solution 44 is always at a saturated level. Because the refilling aperture 43 is located in the upper portion of side wall 38, the replacement water flows into the dissolved chemical solution 44 rather than into the solid or granular chemical 40, so no surging or super-saturation can occur from flow or turbulence effects within the dispenser cartridge 33. In other systems which use a flow through mechanism for dissolving the chemical that do not provide a reservoir of saturated solution, the solution added to the water when the system is restarted after a stoppage period will be excessively high in concentration, since the water remaining in contact with the solid chemical during the stoppage becomes saturated and will be flushed into the flow stream.

The chemical dispenser means 30 is constructed such that its length is easily adjusted by removing the cap member 39 from the dispenser cartridge 33, cutting off a desired length of the upper portion of the side wall 38 and then replacing the cap member 39. If necessary, one or more intake apertures 43 are drilled into the side wall 38. Adjusting the overall length of the dispenser cartridge 33 serves two purposes. It allows a given dispenser cartridge 33 to be shortened for use with tubular filter means 53 that are of shorter length, and it allows the concentration of chemical solution 44 within the water flow to be reduced. This occurs because the shortened dispenser cartridge 33 allows a greater amount of water to flow unimpeded through the tubular filter means 53.

The invention can be constructed as a complete unit including base member 10, housing 20 and dispensing means 30, which is then incorporated into a water delivery system, or the dispensing means 30 can be retrofitted into existing base member 10 and housing 20 combinations.

Figure 3:
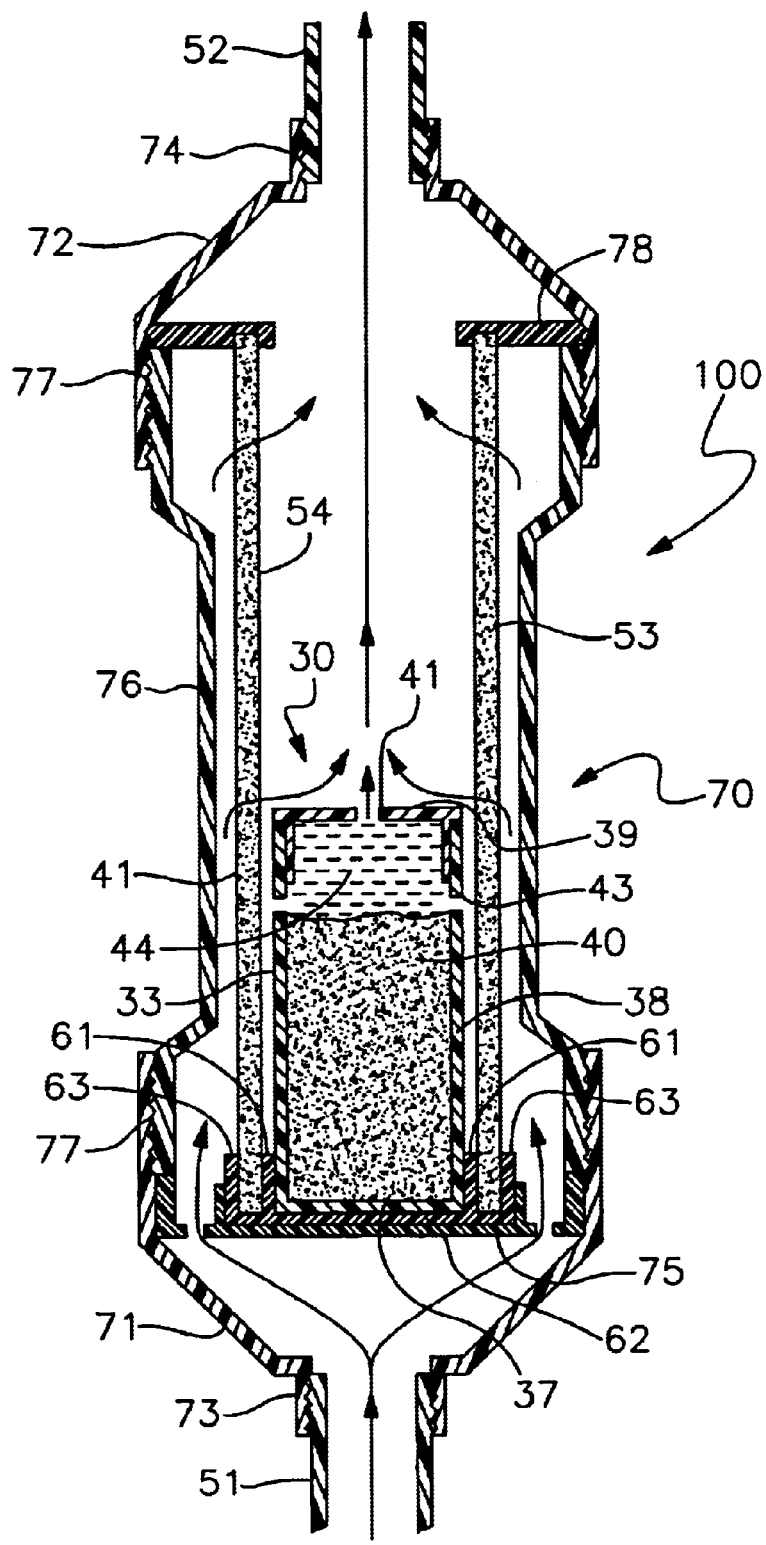
FIG. 3 is a cross-sectional view of the dispenser cartridge disposed within a unidirectional filter apparatus.

An alternative embodiment is shown in FIG. 3, which illustrates a unidirectional chemical dispenser device 100 comprising in general a generally cylindrical housing 70 and a chemical dispensing means 30 contained within housing 70. The cylindrical housing 70 is adapted to be connected in a water flow line, such that housing 70 is provided with an inflow conduit 73, typically threaded, to receive the end of an inlet conduit 51 to deliver water or another liquid into the housing 70. Housing 70 is also provided with an outflow conduit 74, also typically threaded, to receive the end of an outlet conduit 52, for delivery of the treated water or other liquid for usage. The inflow conduit 73 and outflow conduit 74 are coaxially aligned within housing 70. The inflow conduit 73 directs the water flow through a support member 75, which may comprise a holder means for an apertured disk or a filter disc formed from a ceramic or relatively rigid woven material, such as for example a POREX brand 20 micron filter. The support member 75 supports the chemical dispensing means 30 in a generally vertically oriented direction and is adapted to retain the cartridge retainer means 60. Alternatively, the cartridge retainer means 60 may be designed to function in the place of and in the manner or the support member 75 by extending the base 62 to meet the housing 70, with appropriate apertures, such that the dispenser means 30 and tubular filter means 53 are properly positioned and retained and water flow is directed to the outside of the filter means 53. The housing 70 is a hollow container having a main body 76, an inflow end 71 and an outflow end 72, and the ends 71 and 72 may be detachably joined to the main body 76 by coupling means 77, such as threading, mechanical interlock, friction fit or the like. This allows the housing 70 to be opened to remove and replace a depleted dispensing means 30 or other components when necessary. The combination of main body 76, inflow end 71 and outflow end 72 define a closed system such that main water flow through the housing 70 occurs in a single direction from the inflow conduit 73 to the outflow conduit 74, often described as in-line or unidirectional.

Filter means 53 of known configuration and type having a cylindrical hollow core 54 is disposed within housing 70. The filter means 53 may comprise a carbon block filter, a wound filter, a melt blown filter, an extruded filter, a pleated membrane, a tubular ceramic filter, or a simple screen, wrap or mesh member which surrounds the dispensing means 30, such that all water must pass through the filter means 53 before entering the dispenser means 30. Filter retainer means 78 is disposed on the outflow side of the filter means 54 and serves as a dam to force all water flow through the body of the filter means 54.

Once the invention is installed in the water flow line and water flow is initiated for the first time, the water flows through inflow conduit 73 in inflow end 27, through the support disk 75 and into the main body 76 of housing 70. The water passes through filter means 53 and contacts dispenser cartridge 33. As water flows into the interior of filter means 53, a small amount of water enters the intake apertures 43 in the upper portion of side wall 38 of chemical dispenser cartridge 33 and fills the upper portion of the interior 42 of the dispenser cartridge 33, dissolving a portion of the solid or granular chemical 40 contained therein. After a short period of time, the percentage of chemical 40 dissolved in the water reaches its maximum saturated value, whereby no further dissolving can occur. At this point, the concentration percentage of the solution 44 becomes steady state. As water continues to flow into housing 70, the water flows into outflow conduit 17 through outlet opening 12 and into outflow conduit 23. The relatively large volume of water flow adjacent the dispensing aperture 41 results in a pressure differential which draws a small amount of the saturated chemical solution 44 from within the dispenser cartridge 33 out through dispensing aperture 41. This chemical solution 44 is then mixed in the turbulent flow such that water flowing from the device is treated as desired.

It is contemplated that equivalents and substitutions may be apparent to those skilled in the art, and the true scope and definition of the invention therefore is to be as set forth in the following claims.

I claim:

1. A device for introducing a chemical solution into a flow of liquid, said device comprising a dispenser cartridge, cartridge retainer means and a tubular filter means;

said dispenser cartridge comprising a closed bottom, a side wall containing at least one intake aperture positioned in the upper portion of said side wall, and a removable cap member containing at least one dispensing aperture, said bottom, cap member and side wall defining an interior and containing a chemical in solid form, whereby liquid enters said dispenser cartridge through said intake aperture and contacts said chemical to dissolve said chemical and form a saturated chemical solution within said dispenser cartridge interior, and whereby said saturated solution exits said dispenser cartridge through said dispensing aperture in response to liquid flow around said dispenser cartridge;

said cartridge retainer means adapted to retain said dispenser cartridge within said tubular filter means and in fixed position relative to said tubular filter means.

2. The device of claim 1, wherein said cartridge retainer means comprises a base member, an interior retainer flange adapted to receive said dispenser cartridge, and an outer flange adapted to receive said tubular filter means.

3. The device of claim 1, wherein the size of said intake aperture and said dispensing aperture are small relative to the size of said tubular filter means.

4. The device of claim 3, wherein said intake aperture and said dispensing aperture are between 0.042 and 0.1875 inches in diameter.

5. The device of claim 1, wherein said filter means comprises a filter having a cylindrical hollow core.

6. The device of claim 5, wherein said filter means is a filter chosen from the group of filters consisting of carbon block, pleated membrane, wound, melt blown and extruded filters.

7. The device of claim 1, wherein said dispenser cartridge is adapted such that the length of said dispenser cartridge is reduceable by removing said cap member, removing an upper portion of said side wall and replacing said cap member.

8. A device for introducing a chemical solution into a flow of liquid within a filter apparatus, said filter apparatus comprising a tubular filter means, a base member adapted to be incorporated into a flow conduit line, said base member having an inlet opening adapted to receive an inlet conduit, an outlet conduit adapted to receive an outlet conduit, a downflow opening communicating with said inlet opening, a centrally located upflow opening communicating with said outlet opening, and mating means adapted to receive a cylindrical housing, said cylindrical housing comprising an outer wall, closed bottom and open top, and adapted to mate with said mating means of said base member, and said device comprising:

dispenser means comprising a dispenser cartridge and cartridge retainer means for retaining said dispenser cartridge, said dispenser cartridge comprising a closed bottom, a side wall containing at least one intake aperture positioned in the upper portion of said side wall, and a removable cap member containing at least one dispensing aperture, said bottom, cap member and side wall defining an interior and containing a chemical in solid form, whereby liquid enters said dispenser cartridge through said intake aperture and contacts said chemical to dissolve said chemical and form a saturated chemical solution within said dispenser cartridge interior, and whereby said saturated solution exits said dispenser cartridge through said dispensing aperture in response to liquid flow through said tubular filter means.

9. The device of claim 8, where the size of said intake aperture and said dispensing aperture are small relative to the size of said tubular filter means.

10. The device of claim 9, where said intake aperture and said dispensing aperture are between 0.042 and 0.1875 inches in diameter.

11. The device of claim 8, wherein said filter means comprises a filter having a cylindrical hollow core.

12. The device of claim 11, where said filter means is a filter chosen from the group of filters consisting of carbon block, pleated membrane, wound, melt blown and extruded filters.

13. The device of claim 8, wherein said dispenser cartridge is adapted such that the length of said dispenser cartridge is reduceable by removing said cap member, removing an upper portion of said side wall and replacing said cap member.

14. A device for introducing a chemical solution into a flow of liquid within a filter apparatus, said filter apparatus comprising a tubular filter means and a housing adapted to be incorporated into a flow conduit line, said housing having an inflow end with an inflow conduit adapted to receive an inlet conduit and an opposing outflow end with an outflow conduit adapted to receive an outlet conduit connected to a main body, such that liquid flow through said housing is generally in a single direction, said device comprising;

dispenser means comprising a dispenser cartridge and cartridge retainer means for retaining said dispenser cartridge, said dispenser cartridge comprising a closed bottom, a side wall containing at least one intake aperture positioned in the upper portion of said side wall, and a removable cap member containing at least one dispensing aperture, said bottom, cap member and side wall defining an interior and containing a chemical in solid form, whereby liquid enters said dispenser cartridge through said intake aperture and contacts said chemical to dissolve said chemical and form a saturated chemical solution within said dispenser cartridge interior, and whereby said saturated solution exits said dispenser cartridge through said dispensing aperture in response to liquid flow through said tubular filter means.

15. The device of claim 14, further comprising a support member positioned within said inflow end of said housing, such that liquid flowing through said inflow conduit passes through said support member prior to passing through said tubular filter means, said support member retaining said dispenser means and said tubular filter in a fixed position relative to said housing.

16. The device of claim 14, where said inflow conduit and said outflow conduit are coaxially aligned.

17. The device of claim 14, where at least one of said inflow end and said outflow end is detachable from said main body whereby said dispenser means can be removed from said housing.

18. The device of claim 14, wherein said filter means comprises a filter having a cylindrical hollow core.

19. The device of claim 18, where said filter means is a filter chosen from the group of filters consisting of carbon block, pleated membrane, wound, melt blown and extruded filters.

20. The device of claim 14, wherein said dispenser cartridge is adapted such that the length of said dispenser cartridge is reduceable by removing said cap member, removing an upper portion of said side wall and replacing said cap member.

* * * * *